(12) United States Patent
Kelley et al.

(10) Patent No.: US 7,155,726 B2
(45) Date of Patent: Dec. 26, 2006

(54) SYSTEM FOR DYNAMIC REGISTRATION OF PRIVILEGED MODE HOOKS IN A DEVICE

(75) Inventors: Brian Harold Kelley, San Diego, CA (US); Ramesh Chandrasekhar, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 280 days.

(21) Appl. No.: 10/697,635

(22) Filed: Oct. 29, 2003

(65) Prior Publication Data

US 2005/0097562 A1    May 5, 2005

(51) Int. Cl.
*G06F 9/44*    (2006.01)
(52) U.S. Cl. .................. 719/310; 712/43; 712/229
(58) Field of Classification Search .............. 719/310, 719/312; 711/6, 100, 203, 207, 151; 710/261, 710/262; 707/103 R, 9; 712/43, 229
See application file for complete search history.

(56) References Cited

U.S. PATENT DOCUMENTS

| | | | | |
|---|---|---|---|---|
| 4,604,688 A | * | 8/1986 | Tone | 711/207 |
| 5,109,329 A | * | 4/1992 | Strelioff | 710/261 |
| 5,920,894 A | * | 7/1999 | Plog et al. | 711/151 |
| 5,937,199 A | * | 8/1999 | Temple | 710/262 |
| 5,950,221 A | * | 9/1999 | Draves et al. | 711/100 |
| 6,175,916 B1 | * | 1/2001 | Ginsberg et al. | 712/228 |
| 6,247,064 B1 | * | 6/2001 | Alferness et al. | 719/312 |
| 6,349,355 B1 | * | 2/2002 | Draves et al. | 711/6 |
| 6,594,671 B1 | * | 7/2003 | Aman et al. | 707/103 R |
| 6,804,766 B1 | * | 10/2004 | Noel et al. | 711/203 |

OTHER PUBLICATIONS

Maly et al. "A privilege management system for a secure network" 1996 IEEE, pp. 147-154.*
Maly et al. "A privilege management and enforcement system for distributed resource sharing" 1996 IEEE, pp. 106-111.*

* cited by examiner

*Primary Examiner*—William Thomson
*Assistant Examiner*—Van H. Nguyen
(74) *Attorney, Agent, or Firm*—Philip R. Wadsworth; Robert J. O'Connell; Christopher S. Chow

(57) ABSTRACT

Methods and apparatuses are provided for dynamic registration of privileged mode hooks in a device that can operate in a privileged mode and a non-privileged mode. A data structure is provided which maps between identifiers and functions. An available slot in the data structure is used to store a pointer associated with a function. The identifier can then be made accessible to non-privileged applications.

20 Claims, 3 Drawing Sheets

SYSTEM FOR DYNAMIC REGISTRATION OF PRIVILEGED MODE HOOKS IN A DEVICE

CROSS REFERENCE TO RELATED APPLICATIONS

This application is related to U.S. patent application Ser. No. 10/697,592 entitled "SYSTEM FOR PROVIDING TRANSITIONS BETWEEN OPERATING MODES OF A DEVICE", filed Oct. 29, 2003, assigned to the assignee hereof, and expressly incorporated by reference herein.

BACKGROUND

I. Field

The present invention relates generally to the efficient operation of a device, and more particularly, to a system for dynamic registration of privileged mode hooks in a device.

II. Description of the Related Art

Advances in technology have resulted in the development of a variety of devices for home, office, and personal use. For example, computer systems, such as desktops, notebooks, and tablet computers have become powerful tools for use at home or in office environments. Personal devices, such as wireless telephones, personal digital assistants (PDAs), and paging devices have also become more powerful and are now widely used.

Many devices now comprise complex hardware and software that run operating systems such as UNIX, LINUX, or similar operating systems. Generally, these operating systems provide for multiple modes of operation. For example, most systems provide privileged and non-privileged modes of operation. Programs executing in the privileged mode of operation are allowed to access memory and system resources without limitation. Programs executing in the non-privileged mode are restricted from accessing certain memory regions and/or device systems. This configuration provides a level of protection to important memory or device functions. For example, by executing third-party applications in the non-privileged mode, important memory regions and device functions can be protected from unauthorized access. Also, such an arrangement allows the system to isolate faults during execution.

Over time, these systems have grown more sophisticated to meet the increasing needs of devices and device users. For example, function modules, or functions, are used to provide a variety of system services. As devices have become more complicated and feature rich, the number and complexity of the functions associated with these features has also increased.

Unfortunately, conventional systems have several limitations with regards to supporting function modules. For example, conventional systems may have a limited number of hooks used to access functions. For example, the system may have a limited number of traps that can be used to access functions. Furthermore, the trap definitions are compiled into a binary executable that runs on the device, which results in an inherent limitation on the system's flexibility.

Therefore, what is needed is a system that provides a way to dynamically register hooks to privileged functions. The system should allow functions to be registered during system initialization, thereby providing flexibility and avoiding potential versioning problems inherent in conventional systems that compile trap definitions into an executable. The system should also allow an unlimited number of functions to be registered thereby overcoming restrictions associated with conventional systems that associate a fixed number of available traps to functions.

SUMMARY

In one or more embodiments, a system comprising methods and/or apparatus operates to provide dynamic registration of privileged mode hooks in a device. In one embodiment, different program modules install hooks during system initialization. Each function module is assigned an identifier when it is installed, and the module retains this identifier in a variable that is readable by non-privileged applications. When called from an application executing in non-privileged mode, the module retrieves its hook identifier from the variable to execute the hook. This avoids potential versioning problems inherent in conventional systems that associate functions with a fixed number of traps, which are compiled into the binary executable.

In one embodiment, a method is provided for dynamically registering a function in a device that includes at least two operating modes comprising a privileged mode and a non-privileged mode. The method comprises identifying an available slot in a data structure that maps identifiers to functions, and storing a pointer associated with the function in the slot. The method also comprises retrieving an identifier that is associated with the slot, and making the identifier accessible to non-privileged applications.

In another embodiment, apparatus is provided for dynamically registering a function in a device that includes at least two operating modes comprising a privileged mode and a non-privileged mode. The apparatus comprises logic to identify an available slot in a data structure that maps identifiers to functions, and logic to store a pointer associated with the function in the slot. The apparatus also comprises logic to retrieve an identifier that is associated with the slot, and logic to make the identifier accessible to non-privileged applications.

In another embodiment, apparatus is provided for dynamically registering a function in a device that includes at least two operating modes comprising a privileged mode and a non-privileged mode. The apparatus comprises means for identifying an available slot in a data structure that maps identifiers to functions, and means for storing a pointer associated with the function in the slot. The apparatus also comprises means for retrieving an identifier that is associated with the slot, and means for making the identifier accessible to non-privileged applications.

In another embodiment, a computer-readable media is provided comprising instructions, which when executed by a processor in a device, operate to dynamically register a function in the device. The device includes at least two operating modes comprising a privileged mode and a non-privileged mode. The computer-readable media comprises instructions for identifying an available slot in a data structure that maps identifiers to functions, and instructions for storing a pointer associated with the function in the slot. The computer-readable media also comprises instructions for retrieving an identifier that is associated with the slot, and instructions for making the identifier accessible to non-privileged applications.

Other aspects, advantages, and features of the present invention will become apparent after review of the hereinafter set forth Brief Description of the Drawings, Detailed Description of the Invention, and the Claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes a dynamic registration system that operates to provide dynamic registration of privileged mode hooks in a device. For example, the system operates to allow function hooks to be registered during a device initialization process, or at any time before the function is called. In one embodiment, the registration process produces a function identifier that is stored in a static variable, which is readable by both privileged and non-privileged applications. By obtaining the identifier, a privileged or non-privileged application can access the services provided by the function. Because each registered function is access through it own interface, the system overcomes the problems associated with associating functions with a fixed number of traps, as in conventional systems.

In one or more embodiments, the registration system interacts with a runtime environment (or operating system) executing on the device that is used to simplify operation of the device, such as by providing generalized calls for device specific resources. One such runtime environment is the Binary Runtime Environment for Wireless™ (BREW™) software platform developed by QUALCOMM, Inc., of San Diego, Calif. The following description describes a device executing a runtime environment, such as the BREW software platform. However, in one or more embodiments, the registration system is suitable for use with other types of runtime environments to provide fast and efficient registration of privileged function hooks in a variety of devices, including generating systems or other controlling or monitoring programs. For example, the devices may include, but are not limited to, desktop computers, notebook computers, handheld computers, and portable devices, such as wireless telephones, pagers, PDAs, email devices, tablet computers, or other type of computing devices.

Figure 1:
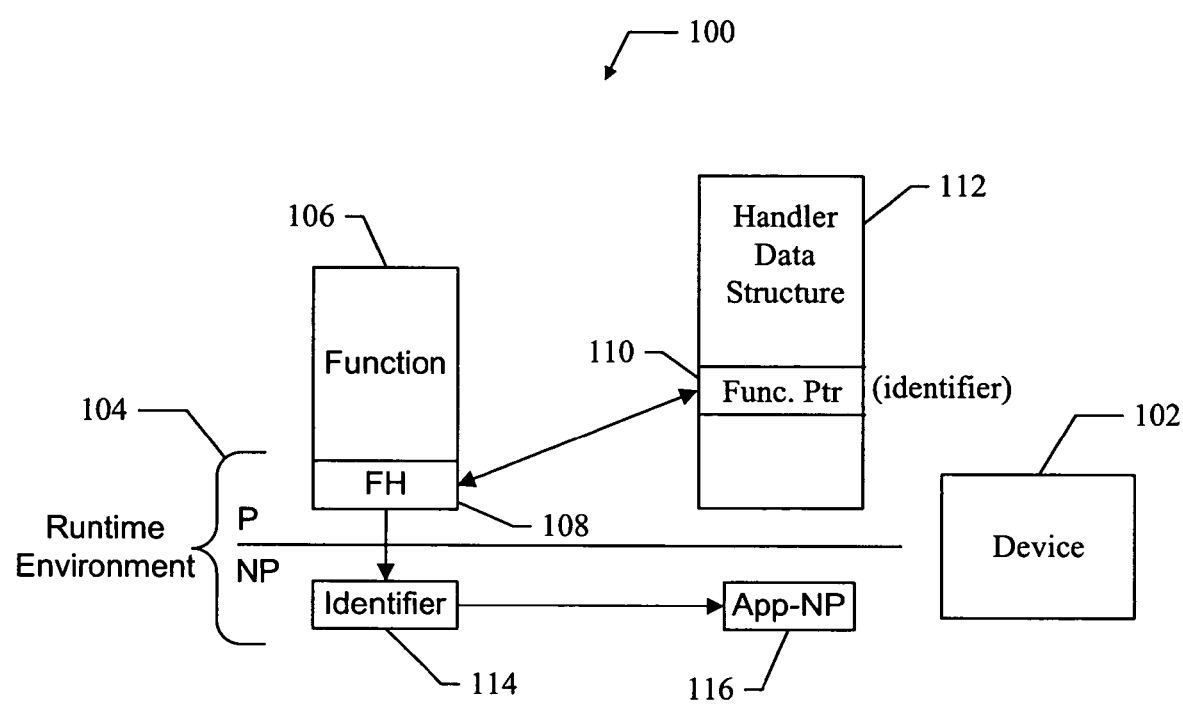
FIG. 1 shows one embodiment of a dynamic registration system that operates to provide dynamic registration of privileged mode hooks in a device.

FIG. 1 shows one embodiment of a dynamic registration system 100 that operates to provide dynamic registration of privileged mode hooks in a device 102. The system 100 may be part of a home computer, office computer, or personal device, such as a wireless telephone or PDA, or any other type of computing device.

In one embodiment, the device 102 includes a runtime environment 104 (i.e., BREW) that provides at least two modes of operation; namely a non-privileged mode (NP) and a privileged mode (P). The non-privilege mode of operation is used to restrict the access of applications running on the device and to provide fault detection. For example, applications running in non-privileged mode are restricted to selected memory regions and may be denied access to device registers or other resources. The privileged mode of operation allows applications running under this mode to access memory or device resources without limitation.

During system initialization, the function 106 is dynamically registered to allow applications executing on the device to obtain service from the function 106. A function handler 108 associated with the function operates to find an available slot 110 in a handler data structure 112. The handler 108 stores a function pointer that points to the function 106 in the available slot 110. The slot 110 has an associated identifier (or index) that is retrieved by the handler 108 and stored in memory or other region that is accessible by non-privileged applications. For example, in one embodiment, the identifier is stored in a non-privileged mode accessible static variable 114. The static variable 114 is readable by a non-privileged application 116. Thus, the function 106 is registered for use by applications executing on the device. The same process is used to register one or any number of functions. Each function uses an available slot in the handler data structure 112, and stores its associated identifier in, for instance, a static variable that is readable by non-privileged applications.

During device operation, the application 116 executes on the device 102 to provide information, functions, and/or services to the device 102. For example, one type of application may be a viewer application that operates on the device 102 to display movies, news, or other types of multimedia content.

When the application 116 executes on the device 102, it runs under the runtime environment to provide the desired functionality. If the application 116 needs to access the function 106 to obtain services, the application 114 retrieves the identifier from the static variable 114 and uses it to access the function 106.

Figure 2:
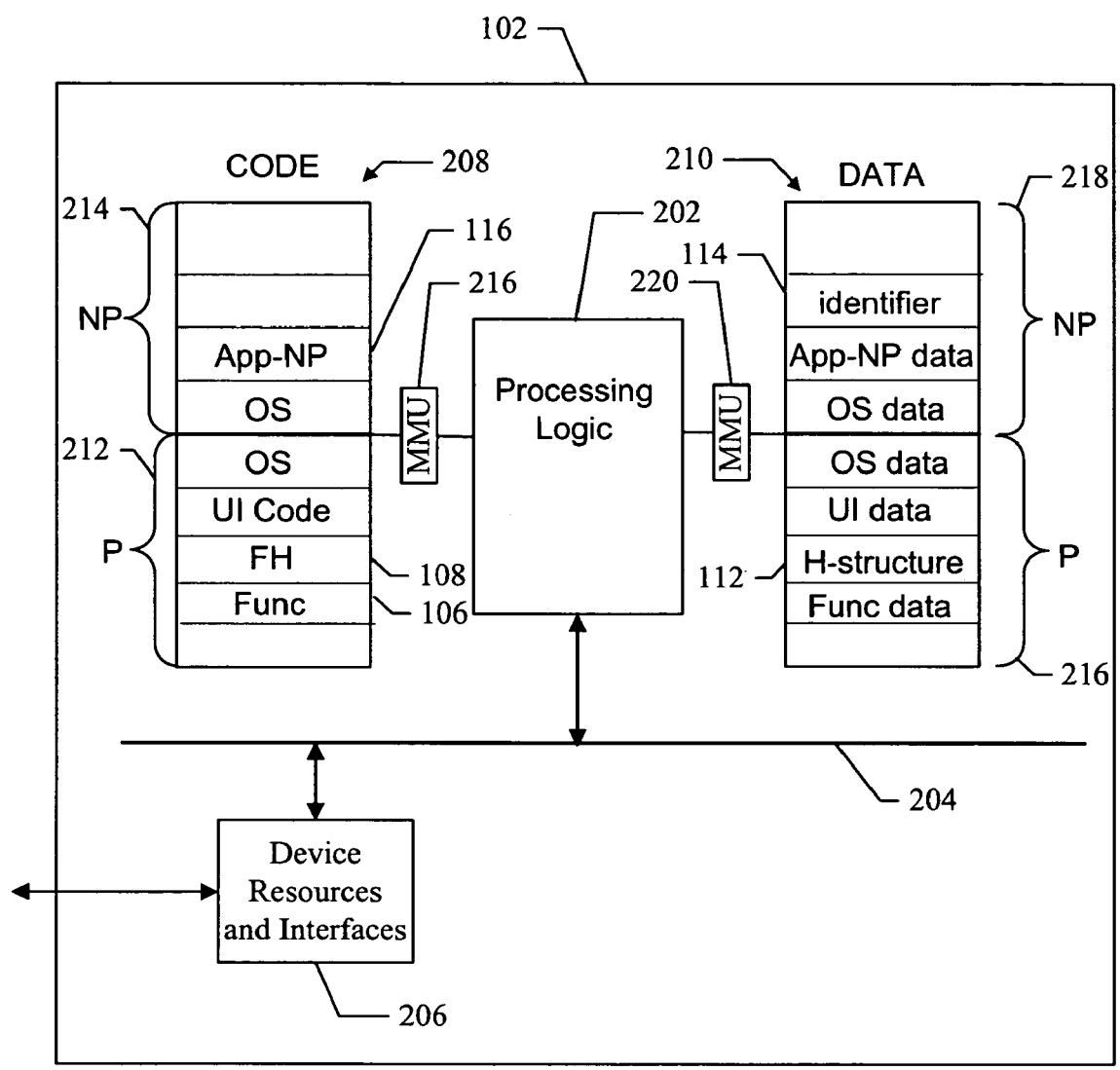
FIG. 2 shows a block diagram of a device comprising one embodiment of a dynamic registration system.

FIG. 2 shows a functional block diagram of the device 102 comprising one embodiment of a dynamic registration system. The device 102 comprises processing logic 202 and device resources 206 that are coupled to an internal data bus 204. The device resources 206 comprise hardware, software, memory, logic, and/or other resources that allow the device to interface to various internal and external resources, devices, or systems. Also coupled to the processing logic 202 are code memory 208 and data memory 210.

In one or more embodiments, the processing logic 202 comprises a CPU, processor, gate array, hardware logic, memory elements, virtual machine, software, I/O interfaces, and/or any combination of hardware and software. Thus, the processing logic 202 generally comprises logic to execute machine-readable instructions. For example, instructions may be loaded into the device 102 from a computer-readable media, such as a floppy disk, CDROM, Flash memory, or other computer-readable media that interfaces to the device 102 via the device resources 206. In another embodiment, the instructions may be downloaded into the device 102 from a network resource, such as a network server or any other type of network resource that interfaces to the device 102 via the device resources 206. The instructions, when executed by the processing logic 202, provide one or more embodiments of a dynamic registration system as described herein.

In one embodiment, code memory 208 comprises RAM, ROM, FLASH, EEROM, or any other suitable type of memory, or a combination thereof. The code memory 206 is partitioned into a privileged region (P) 212 and a non-privileged region (NP) 214 through the operation of a memory management unit 216. The MMU 216 operates to restrict the operation of non-privileged program code so that non-privileged code has limited access rights to selected regions of the code memory 208.

The privileged region 212 includes program code that when executed has unrestricted access to the memory or other systems of the device 102. For example, the privileged code region 212 comprises operating system code (OS), user interface code (UI), function handler 108, and privileged function code 106. The code shown in the privileged code region 212 is representative of the types of privileged code that may be included in the device 102. It is also possible that the privileged code region 212 includes other types of privileged code for execution on the device 102.

The non-privileged code region 214 includes program code that when executed is restricted to accessing only selected memory regions. For example, the non-privileged code region 214 comprises OS code and application code (App-NP) 116.

In one embodiment, data memory 210 comprises a privileged region 216 and a non-privileged region 218. The privileged region 226 comprises data regions that may be accessed only by privileged program code. For example, the privileged data region 216 comprises data used by the OS, UI, and function data used by the function 106. The data region 216 also comprises the handler data structure 112.

The non-privileged data region 218 includes data regions that may be accessed by non-privileged program code. For example, the non-privileged data region 218 comprises data used by the non-privileged OS and the App-NP 116. The data region 218 also comprises the static variable 114 that holds the identifier that is associated with the function 106. The MMU 220 operates to restrict access to the non-privileged and privileged data regions. For example, a non-privileged application is restricted from accessing data in the privileged data region 216, or data belonging to other non-privileged applications in the non-privileged data region 218.

It should be noted that the configuration of the device 102 is just one suitable configuration for implementing the described registration system. It is also possible to implement one or more embodiments of the registration system using other device configurations, functional elements or element configurations within the scope of the present invention.

During operation of the device 102, the dynamic registration system registers one or more functions during an initialization process. For example, in one embodiment, during the initialization process functions are registered one by one until all functions have been registered. An available slot in the structure 112 is determined for each function and the identifier for each respective slot is made available so that it may be read by non-privileged applications.

In one embodiment, the described registration system comprises program instructions stored on a computer-readable media, which when executed by the processing logic 202, provides the functions described herein. In one or more embodiments, the computer-readable media comprises a floppy disk, CD, memory card, FLASH memory device, RAM, ROM, or any other type of memory device.

Figure 3:
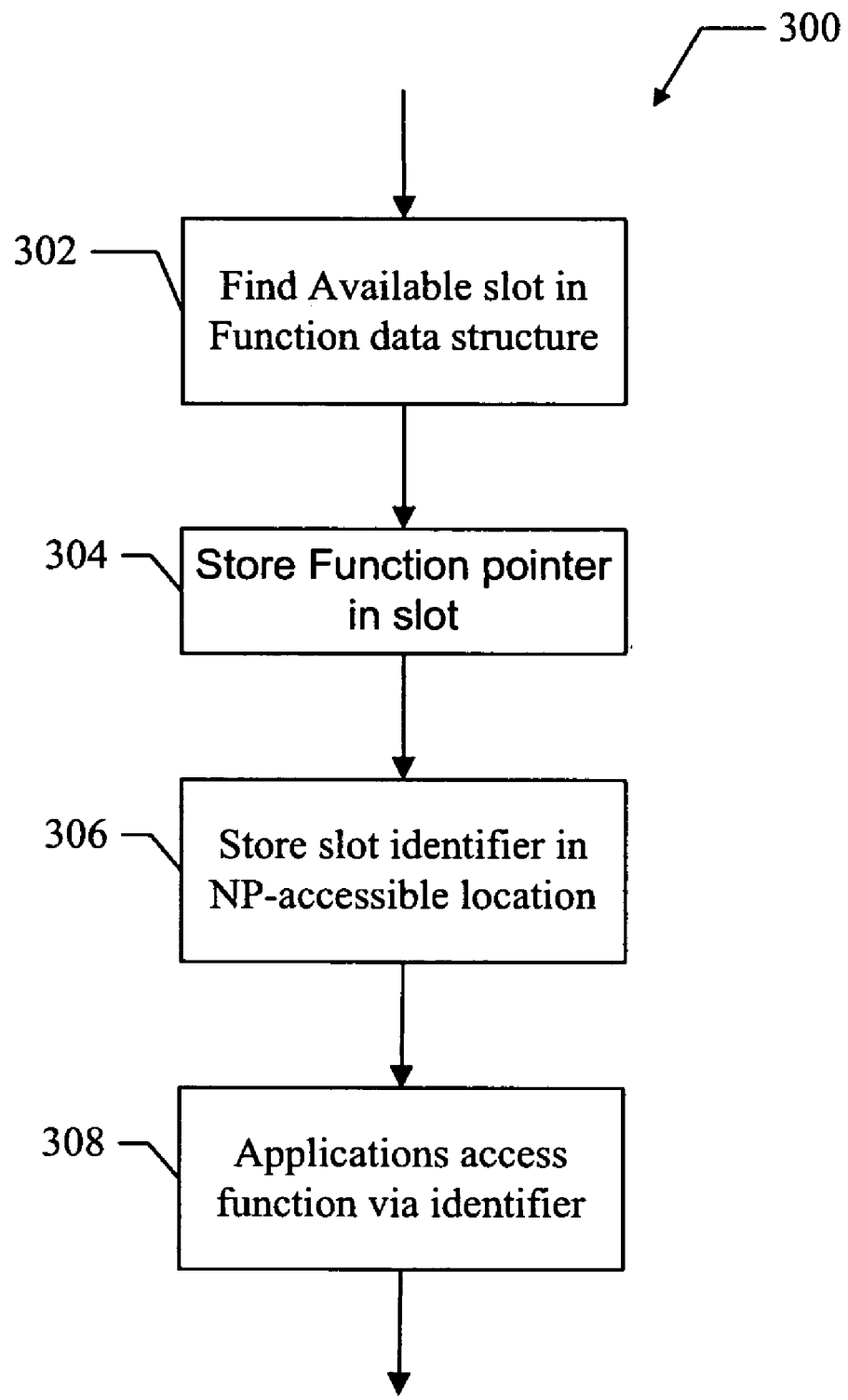
FIG. 3 shows a flow diagram that illustrates the operation of one embodiment of a dynamic registration system for use in a device.

FIG. 3 shows a flow diagram 300 that illustrates the operation of one embodiment of a registration system for use in a device, for example the device 102. For clarity, the flow diagram 300 will be described with reference to the device 102 shown in FIG. 2. It will be assumed that the device is executing a BREW runtime environment and that the processing logic 202 executes program instructions stored in the code memory 208 to perform the functions described below.

At block 302, the registration process begins by finding an available slot in a handler data structure. For example, the processing logic 202 executes program instructions to search the data structure 112 for an available slot. In one embodiment, the data structure 112 is a table and each entry in the table is a slot. Each slot can store an address pointer to a function and each slot has an associated identifier, such as a table index.

At block 304, after an available slot has been found, a pointer to the function to be registered is stored in the slot. For example, an address pointer to the function Func 106 is stored in the available slot 110.

At block 306, the slot identifier is made available for read access by non-privileged applications. For example, the slot identifier is stored in a static variable that is readable by non-privileged applications. For example, the variable may be located in a data region where read/write privileges are granted to privileged applications, and read-only privileges are granted to non-privileged applications.

At block 308, the identifier is used to access the privileged function to perform services for privileged and non-privileged applications. For a detailed description of how the identifier is used to access the privileged function, the reader is referred to U.S. patent application Ser. No. 10/697,592, filed Oct. 29, 2003 and entitled "SYSTEM FOR PROVIDING TRANSITIONS BETWEEN OPERATING MODES OF A DEVICE," which is incorporated by reference herein.

It should be noted that the program flow diagram 300 illustrates just one embodiment and that changes, additions, or rearrangements of the program elements may be made without deviating from the scope of the invention.

Accordingly, while one or more embodiments of methods and apparatus for a dynamic registration system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

We claim:

1. A method for dynamically registering a function in a device that includes at least two operating modes comprising a privileged mode and a non-privileged mode, the method comprising:

identifying an available slot in a data structure that maps identifiers to functions;

storing a pointer associated with the function in the slot;

retrieving an identifier that is associated with the slot;

making the identifier accessible to non-privileged applications; and accessing said function via said identifier in said privileged and non-privileged modes;

wherein:

said function is dynamically registered during device initialization;

said identifier is stored in a static variable that is readable by both privileged and non-privileged applications; and by retrieving said identifier, a privileged or non-privileged application can access the services provided by the function.

2. The method of claim 1, wherein the step of making comprises storing the identifier in memory that is readable by non-privileged applications.

3. The method of claim 1, wherein the device is a wireless device.

4. A method for dynamically registering a function in a device that includes at least two operating modes comprising a privileged mode and a non-privileged mode, the method comprising:
    identifying an available slot in a data structure that maps identifiers to functions;
    storing a pointer associated with the function in the slot;
    retrieving an identifier that is associated with the slot; and
    making the identifier accessible to non-privileged applications;
    wherein:
        said function is dynamically registered during device initialization;
        said identifier is stored in a static variable which is readable by both privileged and non-privileged applications;
        said data structure is a table; and
        by retrieving said identifier and accessing said function via said identifier, both privileged and non-privileged applications can access the services provided by said function.

5. The method of claim 4, wherein the identifier is an index into the table.

6. An apparatus for dynamically registering a function in a device that includes at least two operating modes comprising a privileged mode and a non-privileged mode, the apparatus comprising:
    logic to identify an available slot in a data structure that maps identifiers to functions;
    logic to store a pointer associated with the function in the slot;
    logic to retrieve an identifier that is associated with the slot;
    logic to make the identifier accessible to non-privileged applications; and
    logic for accessing said function via said identifier in said privileged and non-privileged modes;
    wherein:
        said function is dynamically registered during device initialization;
        said identifier is stored in a static variable that is readable by both privileged and non-privileged applications; and
        by retrieving said identifier, a privileged or non-privileged application can access the services provided by the function.

7. The apparatus of claim 6, wherein the logic to make the identifier accessible comprises logic to store the identifier in memory that is readable by non-privileged applications.

8. The apparatus of claim 6, wherein the device is a wireless device.

9. An apparatus for dynamically registering a function in a device that includes at least two operating modes comprising a privileged mode and a non-privileged mode, the method comprising:
    logic to identify an available slot in a data structure that maps identifiers to functions;
    logic to store a pointer associated with the function in the slot;
    logic to retrieve an identifier that is associated with the slot; and
    logic to make the identifier accessible to non-privileged applications;
    wherein:
        said function is dynamically registered during device initialization;
        said identifier is stored in a static variable which is readable by both privileged and non-privileged applications;
        said data structure is a table; and
        by retrieving said identifier and accessing said function via said identifier, both privileged and non-privileged applications can access the services provided by said function.

10. The apparatus of claim 9, wherein the identifier is an index into the table.

11. An apparatus for dynamically registering a function in a device that includes at least two operating modes comprising a privileged mode and a non-privileged mode, the apparatus comprising:
    means for identifying an available slot in a data structure that maps identifiers to functions;
    means for storing a pointer associated with the function in the slot;
    means for retrieving an identifier that is associated with the slot;
    means for making the identifier accessible to non-privileged applications; and
    means for accessing said function via said identifier in said privileged and non-privileged modes;
    wherein:
        said function is dynamically registered during device initialization;
        said identifier is stored in a static variable that is readable by both privileged and non-privileged applications; and
        by retrieving said identifier, a privileged or non-privileged application can access the services provided by the function.

12. The apparatus of claim 11, wherein the means for making the identifier accessible comprises means for storing the identifier in memory that is readable by non-privileged applications.

13. The apparatus of claim 11, wherein the device is a wireless device.

14. An apparatus for dynamically registering a function in a device that includes at least two operating modes comprising a privileged mode and a non-privileged mode, the apparatus comprising:
    means for identifying an available slot in a data structure that maps identifiers to functions;
    for storing a pointer associated with the function in the slot
    means for retrieving an identifier that is associated with the slot; and
    means for making the identifier accessible to non-privileged applications;
    wherein:
        said function is dynamically registered during device initialization;
        said identifier is stored in a static variable which is readable by both privileged and non-privileged applications;
        said data structure is a table; and
        by retrieving said identifier and accessing said function via said identifier, both privileged and non-privileged applications can access the services provided by said function.

15. The apparatus of claim 14, wherein the identifier is an index into the table.

16. A computer-readable media comprising instructions, which when executed by a processor in a device, operate to dynamically register a function in the device, wherein the device includes at least two operating modes comprising a privileged mode and a non-privileged mode, the computer-readable media comprising:

instructions for identifying an available slot in a data structure that maps identifiers to functions;

instructions for storing a pointer associated with the function in the slot;

instructions for retrieving an identifier that is associated with the slot;

instructions for making the identifier accessible to non-privileged applications; and instructions for accessing said function via said identifier in said privileged and non-privileged modes;

wherein:

said function is dynamically registered during device initialization;

said identifier is stored in a static variable that is readable by both privileged and non-privileged applications; and by retrieving said identifier, a privileged or non-privileged application can access the services provided by the function.

17. The computer-readable media of claim 16, wherein the instructions for making comprise instructions for storing the identifier in memory that is readable by non-privileged applications.

18. The computer-readable media of claim 16, wherein the device is a wireless device.

19. A computer-readable media comprising instructions, which when executed by a processor in a device, operate to dynamically register a function in the device, wherein the device includes at least two operating modes comprising a privileged mode and a non-privileged mode, the computer-readable media comprising:

instructions for identifying an available slot in a data structure that maps identifiers to functions;

instructions for storing a pointer associated with the function in the slot;

instructions for retrieving an identifier that is associated with the slot;

instructions for making the identifier accessible to non-privileged applications;

wherein:

said function is dynamically registered during device initialization;

said identifier is stored in a static variable which is readable by both privileged and non-privileged applications;

said data structure is a table; and by retrieving said identifier and accessing said function via said identifier, both privileged and non-privileged applications can access the services provided by said function.

20. The computer-readable media of claim 19, wherein the identifier is an index into the table.

* * * * *